United States Patent [19]

Sreenivasan et al.

[11] Patent Number: 4,849,243

[45] Date of Patent: Jul. 18, 1989

[54] PROCESS FOR PRODUCING LOW FAT SPREADS BY PHASE INVERSION

[75] Inventors: Baratham Sreenivasan, Paramus, N.J.; Everton A. Simpson, Brooklyn, N.Y.

[73] Assignee: Lever Brothers Company, New York, N.Y.

[21] Appl. No.: 136,232

[22] Filed: Dec. 21, 1987

[51] Int. Cl.$^4$ .............................................. A23D 3/00
[52] U.S. Cl. ................................... 426/602; 426/603; 426/661; 426/804
[58] Field of Search ................ 426/602, 603, 804, 661

[56] References Cited

U.S. PATENT DOCUMENTS

| 3,889,005 | 6/1975 | Brammer et al. | 426/585 |
| 4,115,598 | 9/1978 | Moran | 426/604 |
| 4,238,520 | 12/1980 | Miller et al. | 426/573 |
| 4,273,790 | 6/1981 | Bosco et al. | 426/335 |
| 4,273,795 | 6/1981 | Bosco et al. | 426/602 |
| 4,292,333 | 9/1981 | Bosco et al. | 426/335 |
| 4,307,125 | 12/1981 | Amer | 426/604 |
| 4,362,758 | 12/1982 | MacNeill et al. | 426/603 |
| 4,366,180 | 12/1982 | Altrock et al. | 426/602 |
| 4,468,408 | 8/1984 | Bosco et al. | 426/604 |
| 4,515,825 | 5/1985 | Moran et al. | 426/603 |
| 4,555,411 | 11/1985 | Moran et al. | 426/603 |
| 4,568,556 | 2/1986 | McCoy | 426/604 |

FOREIGN PATENT DOCUMENTS 2924841 1/1981 Fed. Rep. of Germany .
232048 12/1984 Japan .

Primary Examiner—Donald E. Czaja
Assistant Examiner—Celine Callahan
Attorney, Agent, or Firm—Milton L. Honig

[57] ABSTRACT

A process is provided for preparing a low fat edible water-in-oil emulsion. First, an aqueous phase is formed containing from 0.1–10% of a thickening agent such as gelatin. The aqueous phase is mixed with an oil phase and the combination cooled obtaining a plastic mass of variable electrical conductivity. Thereafter, the mass is worked under high shear at a shearing speed of at least 1000 rpm for a residence time of less than 1 minute in a vessel separate from the heat exchanger to obtain a water-in-oil emulsion having zero electrical conductivity.

6 Claims, No Drawings

PROCESS FOR PRODUCING LOW FAT SPREADS BY PHASE INVERSION

BACKGROUND OF THE INVENTION

1. Field of the Invention

The invention relates to a process for preparing a low fat spread wherein the original oil-in-water emulsion has been completely converted to the water-oil-in form.

2. The Prior Art

Health and calorie consciousness among the public has prompted manufacturers to introduce spreads at different fat contents. Thus, in the past ten years spreads containing fat levels of 45–75%, as against 80% or 40%, have appeared on the market. The majority of these are soft products filled in plastic tubs. At the higher fat contents, these products have excellent oral properties, comparing very favorably with conventional 80% fat products. At lower fat levels, the organoleptic properties are compromised because of high water content. This aspect is most pronounced with stick products.

Modifications of the water phse by use of starch, gelatin, gums and similar thickeners have led to improved organoleptic properties for oil-in-water emulsions. Illustrative of this technology is U.S. Pat. No. 4,238,520 to Miller et al. and U.S. Pat. Nos. 4,292,333, 4,273,795, 4,273,790 and 4,468,408 all to Bosco et al. Fat continuous phase products are reported in U.S. Pat. No. 4,366,180 (Altrock et al.) and U.S. Pat. No. 4,515,825 (Moran et al.) as being obtained by dispersing an oil-in-water emulsion into a fat phase or into a water-in-oil emulsion. Emulsifier systems have also been changed in an attempt to improve oral behavior of low fat spreads. For instance, U.S. Pat. No. 3,889,005 (Brammer et al.) and U.S. Pat. No. 4,115,598 (Moran et al.) report taste improvements with a mixture of saturated and unsaturated monoglycerides in low calorie spreads.

U.S. Pat. No. 4,555,411 (Moran et al.) describes producing a water-in-oil spread starting from an oil-in-water dairy cream by shearing and cooling the dairy cream in the absence of a cream/air interface and where the apparatus has been internally coated with a hydrophobic material. Successful inversion of the emulsion occurs to provide the final oil continuous spread.

U.S. Pat. No. 4,362,758 (MacNeill et al.) reports subjecting an oil-in-water emulsion to cooling and working in at least one scraped-surface heat exchanger to crystallize at least part of the fat. The partially crystallized emulsion is then pumped to a variable-speed crystallizing unit rotating at 600 rpm for a residence time of 100 seconds to obtain a water-in-oil spread. The patent notes, however, that small traces of water may remain unemulsified in this treatment which then requires reworking of the product.

U.S. Pat. No. 4,307,125 (Amer) discloses a low fat butter with improved spreadability and containing high levels of milk solids. This product was prepared by using high levels of monoglycerides combined with hydrocolloids such as gelatin to thicken the aqueous phase. Inversion from a water to an oil continuous product was said to be induced by the working of material in a Votator ® heat exchanger.

It is an object of the present invention to obtain a low fat emulsion that has both good organoleptic properties and is microbiologically stable.

Another object of the invention is to provide a process wherein a water continuous emulsion can be inverted completely to an oil continuous one with a minimum of reprocessing.

A still further object of the invention is to provide a process which reliably converts any traces of water continuous phase into an oil continuous product. In other words, a process is sought that produces an edible spread characterized by the absence of small water beads external to the fat continuous portion.

These and other objects of the invention will become apparent as further details are provided in the subsequent discussion and Examples.

SUMMARY OF THE INVENTION

A process is provided for preparing a low fat edible water-in-oil emulsion of zero electrical conductivity suitable as a spread having from about 20 to 60% oil by weight. The process comprises:

(i) forming an aqueous phase containing from about 0.1% to 10% of a thickening agent by weight of the emulsion;

(ii) forming an oil phase;

(iii) churning together said aqueous and oil phases to form a mixture of oil-in-water and water-in-oil emulsions;

(iv) cooling said mixture in at least one heat exchanger to initiate crystallization of the oil;

(v) working said cooled mixture to obtain a plastic mass being essentially a water-in-oil emulsion having a variable electrical conductivity; and (vi) finishing said mass by further working under high shear with a shearing speed of at least 1000 rpm for a residence of less than 1 minute to obtain said water-in-oil emulsion having zero electrical conductivity.

A thickening agent which has been found to be most effective is that of gelatin and its use should be at no higher than 3% by weight of the final emulsion. Prior to step (v) working under high shear, the cooled mixed phases may be subjected to intermediate shear blending in a unit commonly referred to as a crystallizer. Alternatively, the crystallizer may be replaced with a colloid mill or homogenizer to achieve similar results.

DETAILED DESCRIPTION OF THE INVENTION

The problem of incomplete inversion of a continuous fat phase in the production of low fat spreads has been solved by the present invention. Critical to the invention is the application of high shear mixing to the emulsion. Under this invention, high shear mixing is performed as a finishing step subsequent to the main inversion stage conducted in an apparatus such as a Crystallizer or "C-unit".

Inversion performed in a Crystallizer very frequently fails to go to completion. The crystallized mass after a deep chill is of variable electrical conductivity, as low as 100 $\mu$mhos to a high of infinity. There will frequently remain small beads of water found external to the fat continuous product. By the present invention, a high shear mixer works product that exits from the Crystallizer. By high shear mixer, there is intended to be defined an apparatus with a rotating part that achieves at least 1000 rpm, preferably at least 2000 rpm. Also found critical is the residence time. Product should remain under working no longer than 1 minute, preferably 30 seconds or less in the high shear mixer. Temperatures in this finishing apparatus will normally be determined by that of the product-to-be-worked entering the mixing chamber. No external cooling or heat exchanging devices are applied to the high shear mixer.

In many respects, a suitable high shear mixer for this invention may be an apparatus with the internal configuration identical to that of a "C-unit" sold under the mark Votator ® by the Girdler Corporation. There are, however, two operating distinctions. Normally, a Votator ® Crystallizer or "C-unit" is said to operate within a range of from 150 to 600 rpm. Residence times are also usually at least 1 minute, normally in the area of 1.5 to 10 minutes. In the high shear mixer, as previously mentioned, the rpm must be at least 1000 while the residence time must be less than 1 minute.

The process of this invention in its broadest sense involves the steps of separately forming an aqueous and an oil phase, combining these phases and churning the mixture together, cooling the churned mixture to initiate fat crystallization, working the product under low to moderate shear to effect inversion, and then finishing with high shear mixing to obtain the final low fat continuous emulsion.

More specifically, a number of operating sequences have been investigated for the present process. Common to all the procedures is the separate formation of an aqueous and an oil phase. These phases are then separately metered into a churn which blends the combination at a temperature anywhere from 30° to 50° C. Thereafter, the mixture of oil-in-water and water-in-oil emulsions are pumped for cooling into a Votator ® heat exchanger known as an "A-unit". Here the emulsion mixture, by cooling, initiates the fat crystallization. Preferably, the emulsion mixture passes through a pair of "A-units", the first to pre-cool (around 25° C.) and a second "A-unit" for deep chilling (0°-15° C.). Thereafter, cooled emulsion is directed into a crystallizer "C-unit" operating around 200-800 rpm. From there, inversion is completed in the high shear mixer to obtain a water-in-oil emulsion. Subsequently, the product may be further chilled in an "A-unit" prior to entering a filler device for packaging the resultant spread.

Alternative to use of a "C-unit" crystallizer, there may be employed a colloid mill, CR Mixer, or homogenizer.

Progress of inversion from water to oil continuous phase may be followed by measuring the electrical conductivity. Electrical conductivity testing is based upon the premise that oil-in-water emulsions are highly conducting, especially in the presence of electrolytes such as sodium chloride. Water continuous emulsions have a conductivity of infinity. On the other hand, water-in-oil emulsions do not conduct electricity because the oil/fat continuous phase is an insulator. Consequently, water-in-oil emulsions have zero conductivity. Electrical conductivity can be measured by inserting a probe into the plastic spread. Suitable probes are available from the Solomat Company and may be hooked to a MPM 1000 meter for conductivity measurement.

Alternatively, phase inversion may be followed by measurement with a water-sensitive paper. This paper turns blue when water is present but remains unchanged in color when there is an oil/fat continuous phase.

Organoleptic properties may be improved by careful selection and modification of both the oil and water phases. With respect to the oil phase, the solids content has to be such that the fat component melts in the mouth. SFI profiles for soft and stick finished products are as follows:

| Temperature | Soft | Stick |
|---|---|---|
| 50° F. | 11-16 | 22-28 |
| 70° F. | 4-8 | 10-16 |
| 92° F. | 0-2.0 | 1-3 |

The fat blends for the emulsions of this invention may comprise liquid vegetable oils, partially hardened vegetable oils, fractionated oils and fats of both vegetable and animal origin, or even butter. Interesterified oils and fats may also be utilized so long as the final blends satisfy the above criteria for solid fat content. Typical suitable oils include those of soybean, corn, cottonseed and sunflower oils. Usually, these oils will be partially or completely hydrogenated. Particularly preferred are soybean and cottonseed oils and mixtures thereof. Oil content of the finished emulsion will range from about 20% to 60%, preferably from 35% to 50%, optimally about 40%.

A further critical feature of this invention is the presence of a thickening agent in the aqueous phase. It has been discovered that gelatin, tapioca-dextrin, pregelled tapioca and other modified starches can be used as the thickening agent. Gelatin is the especially preferred thickening agent. Amounts of a thickening agent may range from about 0.1 to 10% by weight of the final emulsion. When gelatin is used, and this is preferred, it is important that no more than about 3% gelatin be employed.

According to this invention, conventional low fat spread additives may be incorporated into the product. These additives include stabilizing emulsifiers, flavorants, salt, colorants, preservatives, vitamins, antioxidants and other functional ingredients.

Among the suitable flavorants ae diacetyl, butyric acid, ethyl butyrate and related ketones, acids and esters. Butter flavors are imparted by these materials. Artificial butter flavor compositions are readily commercially available. However, flavors other than butter may also be formulated.

Emulsifying agents are usually added to obtain a stable emulsion. These emulsifiers will generally have an HLB value between 0 and 8. Illustrative of this category are sorbitan mono-fatty acids such a sorbitan-monostearate, -monooleate, -monopalmitate and -monolaurate. Glyceryl mono- and di-fatty acids are also suitable. For example, there may be utilized glyceryl-dioleate, -diplamitate, -monostearate and -monooleate. Lecithin may also be employed. Frequently, combinations of the above or related emulsifiers will be found most effective for stabilizing the emulsions. Particularly preferred is a combination of lecithin with the mono and diglycerides.

Stabilizing emulsifiers as aforementioned, may be present from about 0.1 to 5% by weight of the total emulsion.

Coloring agents such as carotene and annatto may be included to provide the appropriate yellow color.

Preservatives may be incorporated including citric acid, benzoic acid, sorbic acid and the corresponding salts of the foregoing acids.

Vitamins are usually incorporated into the low fat margarines. These include vitamins A and D.

Antioxidants that may be included are tertiary butyl hydroquinone (TBHQ), butylaed hydroxyanisole (BHA), butylated hydroxytoluene (BHT), EDTA, fatty citrates and various gallates and tocopherols.

In the aqueous phase are usually placed those functional additives soluble in water. Accordingly, salt (sodium chloride) is generally present therein in an amount from about 0.1 to 5% by weight of the total emulsion.

Other recommended ingredients which may be included are edible proteins such as liquid, condensed or dry whey; whey modified by the reduction of lactose and/or minerals; nonlactose containing whey components; albumin; casein; caseinate; vegetable proteins; and soy protein isolate. These are usually present from about 0.01 to 5% by weight of the total emulsion.

The following examples will more fully illustrate the embodiments of this invention. All parts, percentages and proportions referred to herein and in the appended claims are by weight of the total emulsion unless otherwise stated.

EXAMPLE 1

An oil phase was prepared composed of partially hydrogenated soybean and cottonseed oils (SFI 50° F., 12.8; 70° F., 7.0; and 92° F., 1.0), 0.3% distilled unsaturated sunflower oil monoglyceride (90% alpha mono glycerides), 0.20% lecithin, 100–200 ppm flavor, and minor amounts of vitamins, oils and color. The oil phase mixture was stirred and maintained at 60° C. to ensure complete dissolution of all components. Water was heated to about 160° F. and gelatin (1.7% of the total formula) was added slowly under agitation. After the foaming has subsided, there was added 1% whey, 1% salt, 0.1% potassium sorbate, 0.025% citric acid, 0.0075% calcium disodium, ethylene diamine tetra acetate ($CaNa_2$ EDTA), all percentages being based on the total formula weight). The mixture was pasteurized at 160° F. for about 15 minutes. Slowly, this matter phase was added to the oil phase held in a Feed Tank providing a resulting emulsion with a temperature of about 140° F. Thereafter, the hot emulsion was circulated by pump to a first heat exchanger ($A_1$ unit). The mixture in the Feed Tank had a conductivity of 40 $\mu$mhos (near the agitator) and infinity at the wall near its exit from this unit. Prechilled emulsion 74°–90° F. (27–32° C.) from the first heat exchanger was then pumped to a second heat exchanger ($A_2$ unit) which deep chilled the emulsion down to 40°–45° F. (5°–7° C.). Product at this stage was a mixture of crystallized fat and free water phase with infinity conductivity. From the $A_2$ unit the product was passed through a Crystallizer or C-unit (800 rpm), with residence time of about 6 minutes, where it became more margarine like and had a conductivity varying from 400–100 $\mu$mhos. The resultant plastic mass was then further processed through a high shear mixer (1000 rpm) with a residence time less than 30 seconds. Product emerging from the high shear mixer was margarine like and had zero conductivity. This product was packed in plastic tubs (bowls).

Completeness of the inversion was tested by spreading the product on parchment paper with a spatula and working the product by grinding a few times with a spatula (spatula test). No water droplets were seen. A test using water sensitive paper also failed to detect water. Thus, it was evident that phase inversion from oil-in-water to water-in-oil occurred in the Crystallizer and was completed in the high shear mixer.

During the run, it was observed that sometimes the mass coming out of the $A_2$ was more margarine like with a low conductivity. The Crystallizer then converted this into an oil/fat continuous phase with zero conductivity. This phenomena might be explained on the basis that the material in the Feed Tank was a mixture of O/W and W/O type emulsion. When the O/W emulsion is dominant in the feed, the crystallized mass out of the $A_2$ unit has high conductivity. When the W/O is dominant in the feed then the crystallized mass has low conductivity (20–40 $\mu$mhos).

A taste panel of this product against an 80% fat soft margarine yielded the following results:
Preferred 40% Fat—15
Prefer 80% Fat—13
No Preference;13 2

This test shows that, organoleptically, the 40% fat with gelatin is substantially equal to the 80% fat product.

EXAMPLE 2

The oil phase of Example 1 was modified by replacing distilled unsaturated monoglyceride by distilled saturated monoglyceride (fully hardened soybean oil distilled monoglyceride), and the water phase was modified by substituting 0.6% nonfat dry milk solids for whey solids. The resulting emulsion was processed the same way. Electrical conductivity measurements indicated material exiting the $A_2$ unit, Crystallizer, and high shear mixer had conductivities of infinity, 200 $\mu$mhos, and zero, respectively. Spatula and water sensitive paper tests on the product indicated no free water. Taste panel results were:
Prefer 40% fat—13
Prefer 80% fat—12
No Preference—5

EXAMPLE 3

An oil phase composed of liquid sunflower oil, partially hydrogenated soybean and cottonseed oils (SFI 50° F.—13; 70° F.—8.5; 92° F.—0.7) was mixed with 0.3% distilled saturated monoglyceride. All other ingredients of the oil phase were the same as in Example 1. The water phase contained 1.5% gelatin, 1% whey, 1% salt, 0.01% sorbate, 0.051% citric acid and 0.0075% $CaNa_2EDTA$. This emulsion was processed essentially the same way as in Example 1. A product was obtained with zero conductivity and no water separation by the spatula test. Taste panel results:

| | |
|---|---|
| Prefer 40% | 23 |
| Prefer 80% | 7 |
| (corn oil margarine) | |
| No Preference | 0 |

EXAMPLE 4

A study was conducted using the same ingredients as in Example 1 with essentially the same equipment set-up excepting the Crystallizer was replaced by other mixing equipment.

| Mixer | Speed | Conductivity of product out of High Shear Mixer |
|---|---|---|
| Colloid mill | 3490 rpm fully open | 0 |
| | 3490 rpm half open | 0 |
| Homogenizer | 1st stage = 3000–4000 psi | 0 |
| | 2nd stage = 500–1000 psi | |

In all these experiments the conductivity of the deep chilled product (out of the $A_2$ unit) varied from 300

μmhos to infinity. This study demonstrates that though the Crystallizer is the simplest, other mixers will accomplish the same objective.

EXAMPLE 5

An emulsion was prepared as described in Example 1 but the thickening agent was varied as shown below.

| Thickening Agent | Level - % | Conductivity of Product | Stiffness of Product |
|---|---|---|---|
| Gelatin | 0.5 | 0 | Acceptable |
| " | 2.0 | 0 | Acceptable |
| " | 3.0 | 0 | Acceptable |
| " | 4.5 | 0 | Unacceptable |
| Tapioca dextrin (DE-4) | 2.0 | 0 | Acceptable |
| PreGelled tapioca starch | 1.0 | 0 | Acceptable |
| PreGelled corn starch | 0.25 | 0 | Acceptable |
| Tapioca dextrin | 1.0 | 0 | Acceptable |
| PreGelled corn | 0.15 | | |
| Tapioca dextrin | 0.5 | 0 | Acceptable |
| Xanthan gum | 0.15 | 0 | |

These examples are indicative of the variety of water modifying (thickening) agents that can be used but is not limited to these only. Of these water modifying agents, products with gelatin (250 bloom) had superior organoleptic properties. At the higher levels of gelatin, the texture of the products was stiff.

EXAMPLE 6

A blend of soybean oil and partially hardened soybean oil (SFI 50° F., 12; 70° F., 6; and 92° F., 1.5) was mixed with 0.25% distilled saturated acid monoglyceride and 0.2% lecithin. Color, Vitamin A and flavor at normal level was mixed with a pasteurized water phase containing 1.5% gelatin (total product basis), 1% whey, 1.5% salt, 0.1% potassium sorbate, 0.05% citric acid and 0.0075% CaNa$_2$ EDTA. The resulting emulsion was judged oil continuous by visual examination. Processing wasidentical to that of Example 1, except that a third A-unit (A$_3$) was included as part of the system. Observations during this run were as follows:

| Through-put lbs./hr. | Exit A$_3$ | Exit Crystallizer (200 rpm) | Residence Time | Exit High Shear Mixer (1800-2600 rpm) | Residence Time |
|---|---|---|---|---|---|
| 3000 lbs. | 68°-64° F. conductivity 100-300 μmhos | 62°-65° F. conductivity 40-100 μmhos | 180 secs | 64°-70° F. conductivity 0 | 25 secs |
| 5000 lbs. | 58°-60° F. 200-400 μmhos | 62°-66° F. conductivity 100 μmhos | 106 secs | 64°-66° F. conductivity 0 | 15 secs |
| 5000 lbs. | 60°-62° F. 150-300 | off 300-400 | 106 secs | 64°-66° F. conductivity 0 | 15 secs |

The above data demonstrates that most of the phase inversion occurs in the A-units and complete inversion to an oil continuous phase occurs in the crystallizer/high shear combination or in the high shear mixer itself. The product at the filler is fluid and easy to fill with the crystallizer/high shear combination. use of the high shear mixer alone resulted in a product that was stiff and caused wicking in the bowls. Taste Panel results are:

Prefer 40% Fat Spread—25
Prefer 80% Margarine (Soybean Oil)—5
No Preference—0

The foregoing description and examples illustrate selected embodiments of the present invention and in light thereof various modifications will be suggested to one skilled in the art, all of which are within the spirit and purview of this invention.

What is claimed is:

1. A process for preparing a low fat edible water-in-oil emulsion of zero electrical conductivity suitable as a spread having from about 20 to 60% oil by weight, the process comprising:
   (i) forming an aqueous phase containing from about 0.1% to 10% of a thickening agent by weight of the emulsion;
   (ii) forming an oil phase;
   (iii) churning together said aqueous and oil phases to form a mixture of oil-in-water and water-in-oil emulsions;
   (iv) cooling said mixture in at least one heat exchanger to initiate crystallization of the oil;
   (v) working said cooled mixture to obtain a plastic mass being essentially a water-in-oil emulsion having a variable electrical conductivity; and
   (vi) finishing said mass by further working under high shear with a shearing speed of at least 1000 rpm for a residence of less than 1 minute to obtain said water-in-oil emulsion having zero electrical conductivity.

2. A process according to claim 1 wherein the thickening agent is gelatin present in an amount from 0.1 to 3% by weight of the emulsion.

3. A process according to claim 1 wherein the thickening agent is selected from the group consisting of tapioca dextrin, pregelled cornstarch, and gums.

4. A process according to claim 1 wherein said plastic mass of variable conductivity in step (v) is subjected to a low-moderate shear working at a shear rate of less than 1000 rpm and a residence time greater than one minute.

5. A process according to claim 1 wherein the thickening agent is a modified starch.

6. A process according to claim 1 wherein the finishing step (vi) includes a residence time of 30 seconds or less.

* * * * *